United States Patent
Brady et al.

(10) Patent No.: US 7,773,218 B2
(45) Date of Patent: Aug. 10, 2010

(54) SPATIALLY-REGISTERED WAVELENGTH CODING

(75) Inventors: David J. Brady, Durham, NC (US); Michael E. Gehm, Tucson, AZ (US)

(73) Assignee: Duke University, Durham, NC (US)

( * ) Notice: Subject to any disclaimer, the term of this patent is extended or adjusted under 35 U.S.C. 154(b) by 236 days.

(21) Appl. No.: 11/735,562

(22) Filed: Apr. 16, 2007

(65) Prior Publication Data

US 2007/0296965 A1    Dec. 27, 2007

Related U.S. Application Data

(60) Provisional application No. 60/792,335, filed on Apr. 17, 2006.

(51) Int. Cl.
*G01J 3/04* (2006.01)

(52) U.S. Cl. ................ 356/310; 250/281; 250/300; 356/326; 356/330

(58) Field of Classification Search .............. 356/310, 356/326–330; 250/281–300
See application file for complete search history.

(56) References Cited

U.S. PATENT DOCUMENTS 3,888,362 A * 6/1975 Fletcher et al. ............ 414/626
5,277,066 A * 1/1994 Marshall .................... 73/663
5,612,905 A * 3/1997 Maillart et al. ............. 356/602
7,321,841 B2 * 1/2008 Kaneyasu et al. .......... 702/167
7,324,196 B2 * 1/2008 Goldstein et al. .......... 356/328

\* cited by examiner

*Primary Examiner*—Gregory J Toatley, Jr.
*Assistant Examiner*—Iyabo S Alli
(74) *Attorney, Agent, or Firm*—John R. Kasha; Kasha Law LLC

(57) ABSTRACT

Embodiments of the present invention relate to systems and methods for spectral imaging. Electromagnetic energy emanating from an object is passed through a first dispersive element, a coded aperture, and a second dispersive element to a detector plane. A wavelength-dependent shift is created by the first dispersive element. The coded aperture modulates the image emanating from the first dispersive element. The wavelength-dependent shift is removed from the modulated image by the second dispersive element producing a wavelength-independent image measured by the detector. A spectral image of the object is calculated from the measured image, a wavelength-dependent shift of the first dispersive element, the code of the coded aperture, and a wavelength dependent shift of the second dispersive element. A spectral image can be calculated from measurements obtained in a single time step and from a number of measurements that is less than the number of elements in the spectral image.

19 Claims, 19 Drawing Sheets

300

500

1500

1600

SPATIALLY-REGISTERED WAVELENGTH CODING

CROSS-REFERENCE TO RELATED APPLICATION

This application claims the benefit of U.S. Provisional Patent Application Ser. No. 60/792,335 filed Apr. 17, 2006, which is herein incorporated by reference in its entirety.

BACKGROUND OF THE INVENTION

1. Field of the Invention

Embodiments of the present invention relate to systems and methods for spectral imaging. More particularly, embodiments of the present invention relate to spectral imaging systems and methods in which a transmission mask and a pair of match dispersive elements are used to produce a spatio-spectral response within a single time step.

2. Background Information

Traditional digital imaging techniques produce images with scalar values associated with each spatial pixel location in imaging spectroscopy, these scalar values are replaced with a vector containing the spectrum spectral information from that spatial location. The resulting datacube is, therefore, three-dimensional (two spatial dimensions and one spectral dimension).

Spectral imaging has traditionally focused on environmental remote sensing and military target recognition tasks. In recent years, however, there has been a dramatic growth in biophotonics applications, and with that growth has come an increased interest in spectral imaging for biological applications (especially those with security applications).

Straightforward application of traditional spectroscopic techniques to spectral imaging, however, can be problematic. The simplest type of spectral imager combines a tomographic (rotational scanning) or pushbroom (linear scanning) front-end with a traditional slit-based dispersive spectrometer. Unfortunately, the sources tend to be weak and spatially-incoherent. Slit-aperture dispersive spectrometers have extremely poor photon collection efficiency for incoherent sources. When the source is also weak, the absolute number of collected photons can be very small. Further, this small number of photons must be apportioned amongst the large number of "cells" in the data cube. As a result, a given spatio-spectral element tends to contain very few photons and hence has a poor signal-to-noise ratio (SNR).

There have been a number of proposed solutions to the light collection problem over the years. Two very advanced solutions are the scanning-Michelson Fourier-transform spectrometers, and multiplexed pushbroom designs based on digital micro-mirror (DMM) technology. Both approaches have proven successful, however they involve expensive components that are not robust.

More robust and inexpensive solutions also exist. The spectral imaging community has developed a number of different direct-view designs that maximize the light gathering efficiency of the systems. These systems do away with the spectrometer slit altogether and simply view the source through a rotating dispersive element. In this approach, the measurements taken at different rotation angles of the dispersive element are projective measurements through the data cube and can be topographically reconstructed. While the photon efficiency of this type of approach is quite high, there is a drawback. The geometry of the system necessarily limits the range of angles over which projections are made. As a result of the Fourier-slice theorem, this yields an unsampled region of Fourier space. Consequently, the estimate of the data cube is inexact. In the tomographic community, this Fourier undersampling is known as the missing cone problem, because the unsampled region is a conical volume in Fourier space. There has been significant work on algorithmic approaches for "filling in" this missing information. The most successful has been the method of projection onto convex sets (POCS).

A coded-aperture based system, which is similar to the direct-view methods in that it is inexpensive, mechanically robust, and has high light-collection efficiency, is described in U.S. patent application Ser. No. 11/580,925 filed on Oct. 16, 2006, which is herein incorporated by reference in its entirety. This coded-aperture based system, unlike the direct-view methods, has no missing cone. The basic design of the system is based on a 2D coded aperture static multimode multiplex spectrometer (MMS). A static MMS is described in U.S. Pat. No. 7,092,101, which is herein incorporated by reference in its entirety. A 2D coded aperture static MMS is described in U.S. patent application Ser. No. 11/334,546 filed Jan. 17, 2006, which is herein incorporated by reference in its entirety.

In view of the foregoing, it can be appreciated that a substantial need exists for systems and methods that can advantageously perform spectral imaging with a high optical efficiency, with a low component and design cost, and without the missing cone problem.

BRIEF SUMMARY OF THE INVENTION

Embodiments of the present invention allow the calculation of the spectral image of an object from measurements obtained in a single time step.

One embodiment of the present invention is a method for spectrally imaging an object. Electromagnetic energy emanating from the object is passed through a first dispersive element. The dispersed object is imaged on a coded aperture. Electromagnetic energy emanating from the coded aperture is passed through on a second dispersive element and is imaged on a detector. A spectral image of the object is calculated from electromagnetic energy measured at the detector, an effect of the first dispersive element, a coding of the coded aperture, and an effect of the second dispersive element.

Another embodiment of the present invention is another method for spectrally imaging an object. A wavelength-dependent shift is created in a first image of electromagnetic energy emanating from the object by imaging the first image through a first dispersive element onto a coded aperture producing a second image on the coded aperture. The second image is modulated according to a code of the coded aperture. The wavelength-dependent shift in the second image is removed by imaging through the second dispersive element onto a detector producing a wavelength-independent third image on the detector. The third image is measured on the detector. A spectral image of the object is calculated from the measured third image, a wavelength-dependent shift of the first dispersive element, the code of the coded aperture, and a wavelength dependent shift of the second dispersive element.

Another embodiment of the present invention is a system for spectrally imaging an object. The system includes a first dispersive element, a second dispersive element, a coded aperture, a detector, and a processor. The first dispersive element is located between the source object and the coded aperture. The second dispersive element is located between the coded aperture and the detector plane. Electromagnetic energy emanating from the source is passed through the first dispersive element and is imaged onto the coded aperture. Electromagnetic energy emanating from the coded aperture is passed through the second dispersive element. Electromagnetic energy emanating from the second dispersive element is imaged onto the detector. Electromagnetic energy imaged onto the detector is measured by the detector. The processor calculates a spectral image of the object from the electromagnetic energy measured at the detector, an effect of the first dispersive element, a coding of the coded aperture, and an effect of the second dispersive element.

Figure 1:
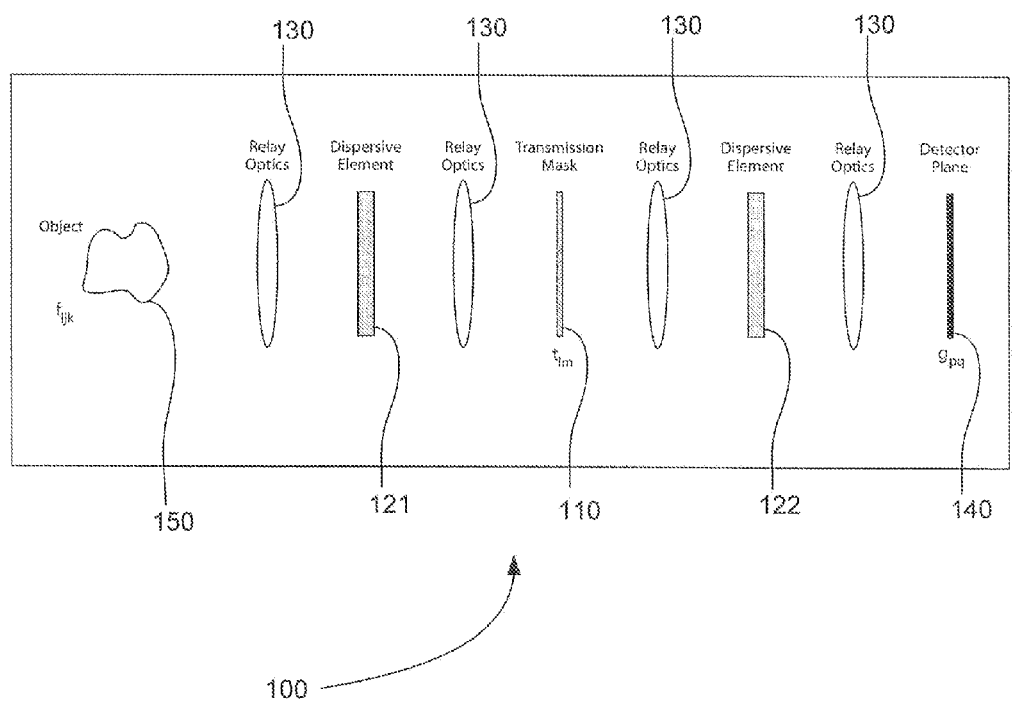
FIG. 1 is a schematic diagram showing a system for performing spatially-registered wavelength coding using a transmission mask and a pair of matched dispersive elements, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

One embodiment of the present invention is system for using aperture coding techniques for implementing (spatially-varying) codes in the spectral structure of a source. The system includes a transmission mask and a pair of matched dispersive elements to produce a programmable spatio-spectral response.

An optical image is described by a spatial-spectral "datacube" $f(x, y, \lambda)$ describing the optical density at spatial position x, y and wavelength $\lambda$. Spectral imaging systems characterize the datacube or subsets thereof using interferometric, filter, or dispersive components.

Dispersive designs have the advantage of simple and robust physical implementation and programmable coding. In dispersive designs measurements take the general form $$g(x,y) = \int t(x-\lambda, y) f(x-\lambda, y, \lambda) d\lambda$$

where t(x, y) is a transmission mask or slit. In the case of computed spectral tomography, t(x, y)=1 and the direction of dispersion is rotated as a function of time. The common theme of these dispersive strategies is that signal components from different spatial image points are multiplexed in linear combinations and later separated by computational processing.

This strategy is in contrast with interferometric measurements, such as those from the imaging Michelson interferometer, which measure different spectral projections on individual spatial image points without interfering light from different points in space. The independent spatial projection strategy has advantages in image registration, independent spectral analysis, and assay monitoring.

Another embodiment of the present invention is a method for using dispersive elements to achieve spatially independent spectral projections. The goal is to achieve measurements of the form $$g_i(x,y) = \int h_i(\lambda) f(x,y,\lambda) d\lambda$$

for a diversity of filter functions $h_i(\lambda)$. Measurements then consist of well-registered spatial images, potentially magnified or demagnified, of the source distribution with spectral projections. Different projections of a single point can be obtained by translating or rotating the source-sensor system aspect or by varying spatial light modulation of coding elements.

FIG. 1 is a schematic diagram showing a system 100 for performing spatially-registered wavelength coding using a transmission mask 110 and a pair of matched dispersive elements 121 and 122, in accordance with an embodiment of the present invention. One skilled in the art can appreciated that transmission mask 110 is a coded aperture, for example.

As seen in FIG. 1, system 100 includes two dispersive elements 121 and 122, some relay/imaging optics 130, a transmission mask 110, and detector plane 140 (bends in the optical path introduced by the dispersive elements have been suppressed in FIG. 1). Source object 150 is imaged onto transmission mask 110 through the first dispersive element 121. Transmission mask 110 can be, but is not limited to, a coded aperture mask. Detector plane 140 can be, but is not limited to, a detector array. A detector array can be, but is not limited to, a one-dimensional array, or a two-dimensional array, for example.

If the source spectral density is represented as $f_{ijk}$ (where the indices indicate position in the x, y, and λ directions, respectively), then the effect of the dispersive element 121 is to shear the datacube such that the cube incident on the transmission mask 110 is $f_{(i+k)jk}$. Representing transmission mask 110 by $t_{lm}$, the datacube just after transmission mask 110 is then $f_{(l+k)mk}t_{lm}$. This optical field is then imaged onto detector plane 140 through dispersive element 122, which is of equal but opposite dispersion. The optical field just prior to detector plane 140 becomes $f_{lmk}t_{(l-k)m}$. Detector plane 140 makes a wavelength-independent measurement of the field, so the final system measurement $g_{pq}$ is $$g_{pq} = \sum_k f_{lmk} t_{(l-k)m} \delta_{lp} \delta_{mq} = \sum_k f_{pqk} t_{(p-k)q},$$

which implements a code along the spatial structure of the source.

It is important to note that the spectral image is calculated from measurements made at detector 140 in a single time step. In other words, it is not necessary to translate, rotate, or defocus system 100 and obtain multiple measurements at detector 140 over time in order to calculate a spectral image. This is an advantage that system 100 has over previous spectral imagers.

It is also important to note that the measurement is spatially-registered with the source. In other words, the (p,q)-th pixel of detector 140 makes a measurement of the (p,q)-th pixel of the source (but with a spectral filter defined by the spatial structure of the transmission mask). This spatial registration between source 150 and detector 140 is the origin of system 100's key advantages.

In previous spatially-coded systems, an optical field is measured in which the spatial and spectral features of the source are mixed. While the codes are well conditioned for computational inversion, the entire structure must be processed at once. In contrast, the spatially-registered spectral codes of system 100 allow for a more local reconstruction technique. A single pixel, or small neighborhood of pixels, can be processed without regard for the other measurements made by detector plane 140.

This local processing is also useful in the context of compressed sensing where the measurements are made using an incomplete code set. The separation of spatial and spectral information allows for more sophisticated block-based schemes.

The spectral image is processed or calculated using a processor (not shown). One skilled in the art can appreciated that a processor can be, but is not limited to, a microprocessor, a microcontroller, or a computer.

The spatial registration occurs because the second dispersive element undoes the spatial shifts introduced by the first element. In previous spatially-coded systems, a fundamental limit on the performance arises because of the so-called "smile distortion," a higher-order effect introduced by the dispersive element. This distortion is wavelength-dependent, so there is no correction technique that can fully eliminate it. As a result, the performance of those systems is fundamentally limited by the presence of this effect. In the embodiment described here, the second dispersive element undoes all of the effects of the first dispersive element, including the higher-order smile distortion (strictly speaking, the smile distortion continues to modify the spectral code, but this form is correctable, in contrast to the spatially coded systems).

Another embodiment of the present invention is a method for spatially-registered wavelength encoding using a pair of opposed dispersive elements (of equal dispersive power) surrounding a transmission mask to implement a code along the spectrum of a source. The dispersive element scan be but are not limited to diffraction gratings, prisms, or a combination of diffraction gratings and prisms. The transmission mask can be implemented via transmission or reflection. The transmission mask can be a dynamic mask, which is a mask in which the pattern on the "transmission mask" is changeable. Implementations of dynamic masks include but are not limited to a digital micromirror (DMM) array or a spatial light modulator (SLM) array.

One characteristic previous spectral imaging methods share is that they generate a number of measurements m that is equal to, or greater than the number of elements n in the reconstructed data cube. Another embodiment of the present invention is compressive spectral imaging. Compressive spectral imaging is an approach to spectral imaging that intentionally generates fewer measurements than elements in the reconstruction. This embodiment builds on the previous POCS work. However, in this embodiment, the missing elements are intentional and have a specifically designed structure.

In the past several years, there has been significant work in the area of compressed sensing. The ability to solve such underdetermined problems relies on the properties of "natural" signals—specifically that they tend to be sparse in some basis other than the naive Dirac sampling basis.

Compressive measurement in the context of traditional (non-imaging) spectroscopy was described in U.S. patent application Ser. No. 11/183,838 filed on Jul. 19, 2005, which is herein incorporated by reference in its entirety. Another embodiment of the present invention is a coded aperture spectral imager that yields a spectral imager that is well suited for compressive measurement. The notional design described below allows for the imposition of an arbitrary code along the wavelength dimension of the data cube. Successful reconstruction of the full data cube from the smaller set of measurements then depends on the co-design of the compressive code and the related inference algorithms.

In another embodiment of system 100, all physical scales are matched to the sampling scale of detector 140 and work solely in a discrete representation. A source spectral density is represented by $f_{ijk}$, where the first, second, and third indices indicate the x, y, and λ coordinates, respectively. Light from source 150 is imaged through dispersive element 121 onto an intermediate plane containing aperture mask 110. Mask 110 modulates the intensity of the light and the resulting distribution is imaged through second dispersive element 122 onto two-dimensional detector array 140 that measures the incident intensity profile $g_{pq}$.

To determine the relationship between the detector measurements and the source spectral density, the propagation of the source is followed through the system. The first dispersive element produces a wavelength-dependent shift of the image on the aperture mask. As a result, the first index of the source (representing the x-position) becomes a mixture of the spatial and wavelength indices. The spectral density just prior to the aperture mask may be $f_{(i+k)jk}$.

The aperture pattern may be denoted as $t_{lm}$. The coding plane is then imaged through another dispersive element (with a dispersion equal and opposite to the first dispersive element) onto a two-dimensional detector plane. This undoes the index mixing in $f$ but introduces a similar index mixing in $t$. The intensity pattern recorded on the detector can be written as $$g_{pq} = \sum_{klmpq} f_{ijk} t_{(l-k)m} \delta_{li} \delta_{mj} \delta_{pi} \delta_{qi}$$

$$g_{pq} = \sum_{k} f_{pqk} t_{(p-k)q}.$$

The Kronecker-deltas enforce the imaging properties of the optical system, while the sum in k represents that fact that the detector is wavelength insensitive. This measurement can be viewed as the imposition of the m th row-code along the wavelength direction of $f$. However, the code is circularly shifted by an amount that depends on the value of the p-index.

This single measurement from the detector plane, however, does not provide enough information to reconstruct $f$. This problem may be solved by making a series of measurements where the aperture code is shifted relative to the source. Considering a set of shifts, indicated by the index $\Delta$, the full set of measurements may be $$g_{pq\Delta} = \sum_{k} f_{pqk} t_{(p-k)(q-\Delta)}. \quad (1)$$

Previously, only code patterns t, which are complete, have been considered. When in complete code patterns are considered where t is row-deficient, the computational problem remains significantly underdetermined. Eqn. 1 can be written in operator form as:

$$g_{pq\Delta} = \sum_{k} H_{k\Delta} f_{pqk}, \quad (2)$$

and solve this linear equation in a least-squares sense for an initial reconstruction $$\tilde{f}_{pqk} = \operatorname{argmin}\left( \left| g_{pq\Delta} - \sum_{k} H_{k\Delta} f_{pqk} \right|^2 \right). \quad (3)$$

The initial reconstruction $\tilde{f}_{pqk}$ is almost certainly going to be poor because of the underdetermined nature of the problem. To improve on the estimate, prior knowledge about the source can be used. This prior knowledge, represented in the form of an inference algorithm, may take many forms, and may draw upon many types of prior knowledge, both structural and statistical.

"Natural" spectra tend to be smooth (or contain a small number of jump discontinuities). However, as the spectra is smoothed to improve the estimates, there is a very important constraint—the estimate, when inserted in Eqn. 1, must produce measurements identical to those observed. This approach is referred to as null-space smoothing, as the constraint can be obeyed by modifying the estimate only in the space spanned by $N_{k\Delta}$, the null space of the operator $H_{k\Delta}$. Operating in this space, the smoothness criterion is implemented as a least gradient problem, which itself can be written in least squares form. The output of the null-space smoothing algorithm $\hat{f}_{pqk}$ forms a final reconstruction.

Ultimately, null-space smoothing is only a part of any successful inference approach. However, to explore the performance of this important component, the following description provides results of an initial simulation of these ideas.

Figure 2:
FIG. 2 is an intensity image of a source used in a simulation, in accordance with an embodiment of the present invention.
Figure 2:
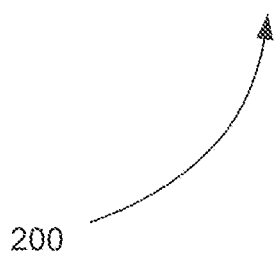

FIG. 2 is an intensity image 200 a source, in accordance with an embodiment of the present invention. A notional system is simulated using freely available spectral imaging data of the Moffett Field region of the San Francisco Bay area. This data is generated by the Airborne Visible/Infrared Imaging Spectrometer (AVIRIS) instrument. This dataset is divided into four roughly equal spatial regions and contains 224 spectral channels. For computational regions, the source is limited to one of the spatial regions (614×495 pixels and the first 128 spectral channels). Intensity image 200 is a sum of all spectral channels.

The coding matrix is derived from the order-128 Hadamard matrix. Because the system operates on the optical intensity, code patterns are restricted to the range [0 1]. To comply with this restriction, all −1 elements in the Hadamard matrix are mapped to zero. Only the 32 lowest frequency rows of the Hadamard matrix are kept equivalent to a 4× downsampling, but with better performance in the presence of noise.

Figure 3:
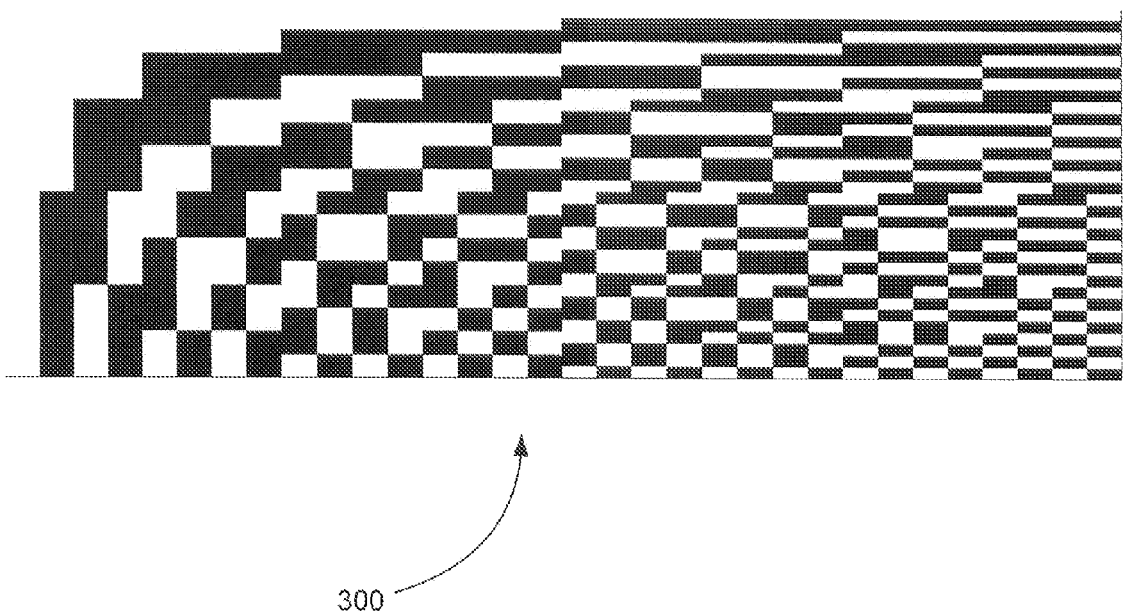
FIG. 3 is a diagram of the coded aperture mask used in the simulation, in accordance with an embodiment of the present invention.

FIG. 3 is a diagram of coded aperture mask 300 used in the simulation, in accordance with an embodiment of the present invention. Coded aperture mask 300 is a coding matrix, for example. White indicates transparent regions of coded aperture mask 300, while black indicates opaque region of coded aperture mask 300, for example. The ultimate performance of an imaging system depends on the co-design of the coding pattern and the inference algorithms.

Figure 4:
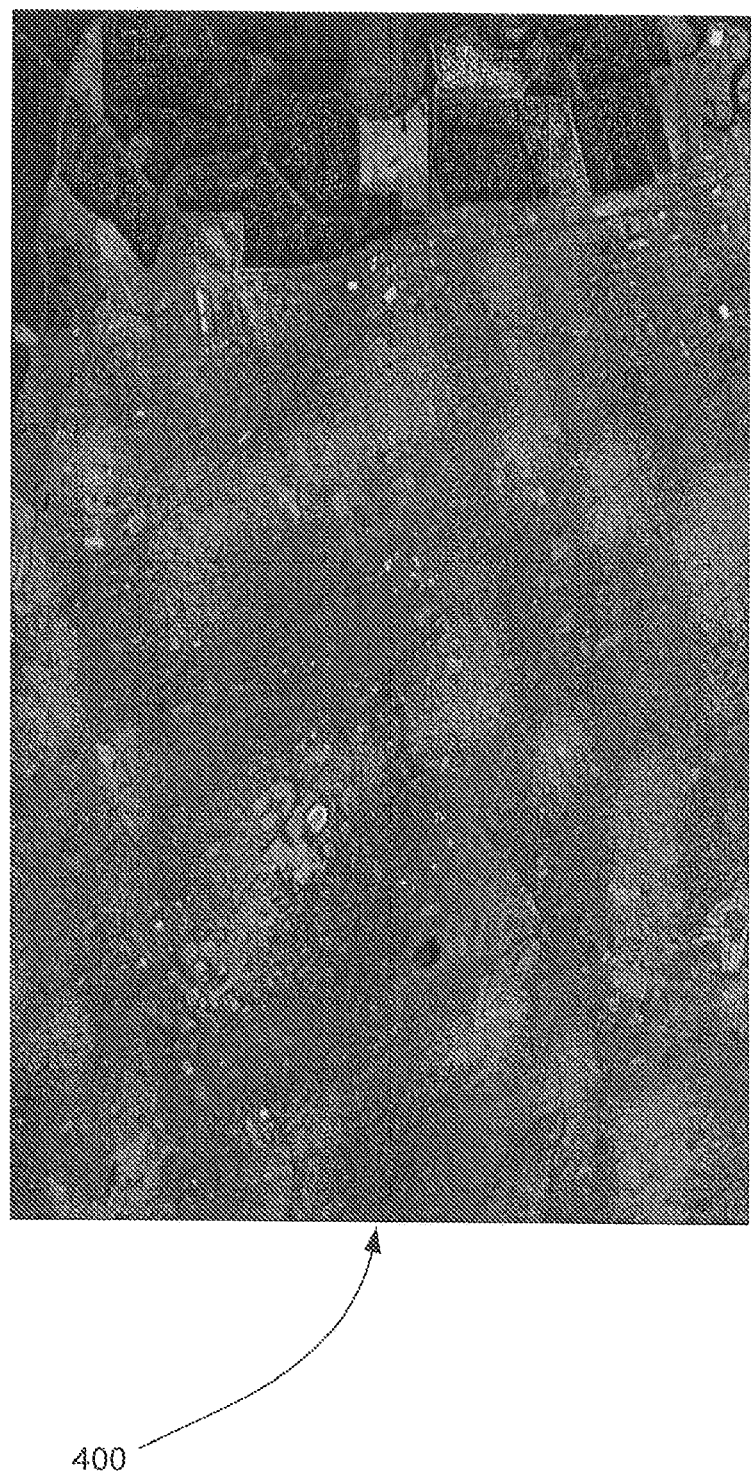
FIG. 4 is a reconstructed intensity image of the source used in the simulation, in accordance with an embodiment of the present invention.

The spectral information at each spatial location is encoded with a properly shifted version of coded aperture mask 300. The measurements are then inverted into an initial estimate using a least-squares solver. The initial estimate is then used as the starting solution in the null-space solver. The output from this routine is taken as the final reconstructed spectrum for the spatial location and is inserted in the appropriate location in the reconstruction datacube. FIG. 4 is a reconstructed intensity image 400 of the source used in the simulation, in accordance with an embodiment of the present invention. Intensity image 400 is the sum over all spectral channels. FIG. 4 can be compared to FIG. 2.

Figure 5:
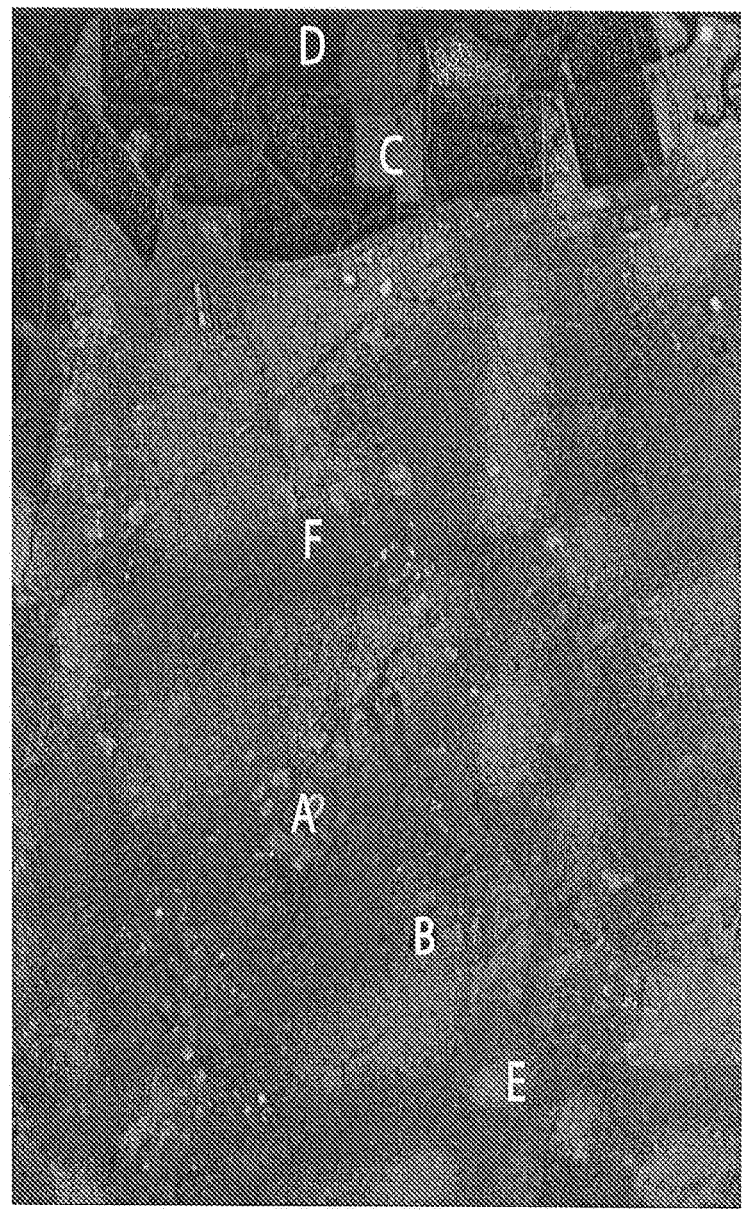
FIG. 5 is an intensity image of the source used in the simulation including a set of spatial locations, in accordance with an embodiment of the present invention.

Of course, the overall performance of a spectral imaging system is hard to judge from an intensity image, since all spectral information is lost. Further comparisons examine spectra at specific spatial locations or images in specific spectral channels. FIG. 5 is an intensity image 500 of the source used in the simulation including a set of spatial locations, in accordance with an embodiment of the present invention. The spatial locations in FIG. 5 (to untutored eyes) are A. Clearly a manmade structure. From its oval shape, perhaps a stadium of some type.
B. A region which appears relatively dark in all spectral bands. Composition unknown.
C. A smooth, grassy region.
D. A stand of trees or agricultural region.
E. A grassy hillside.
F. The center of an urban area.

Figure 6:
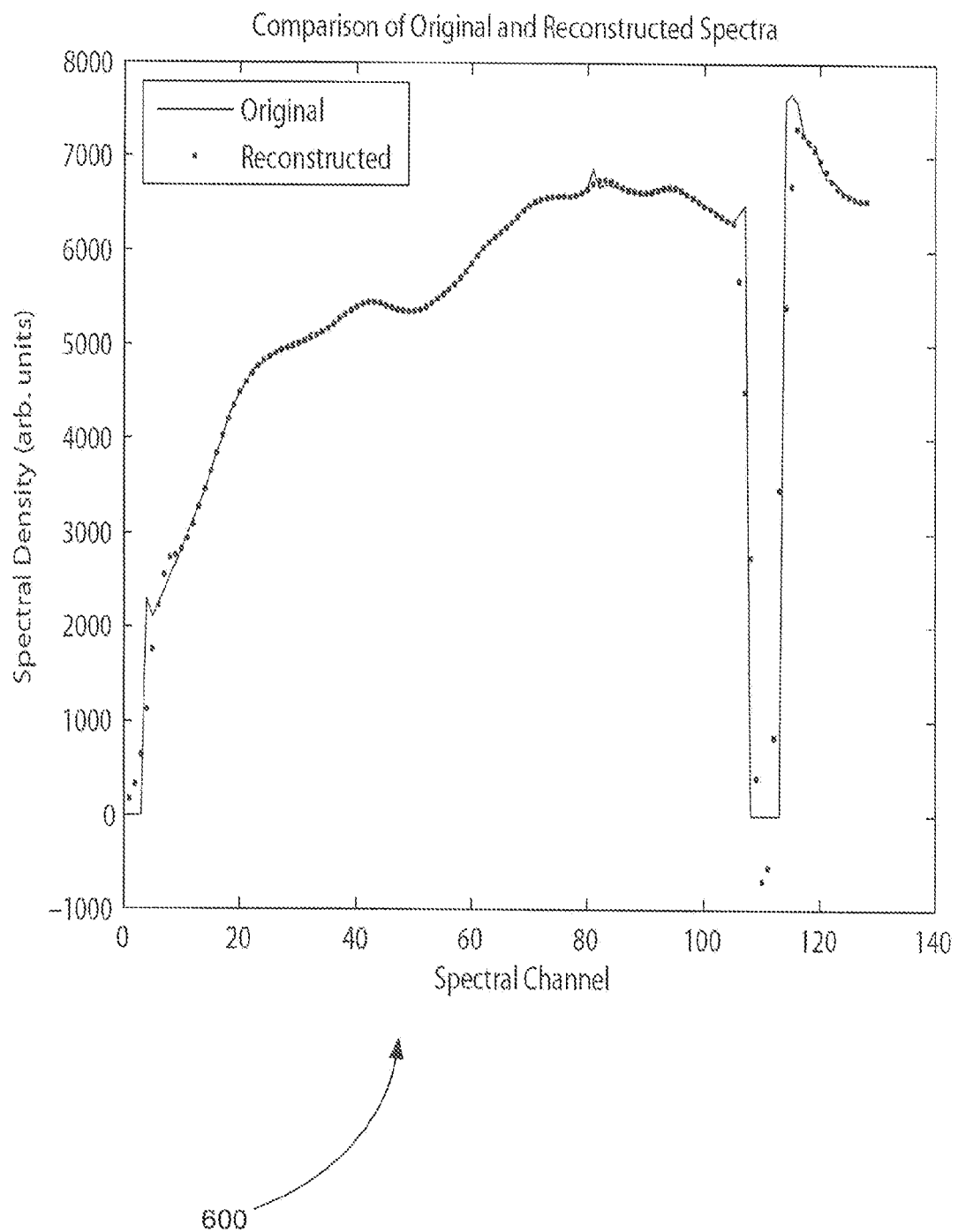
FIG. 6 is a plot comparing the source spectra and the reconstructed spectra at spatial location A, in accordance with an embodiment of the present invention.

FIG. 6 is a plot 600 comparing the source spectra and the reconstructed spectra at spatial location A, in accordance with an embodiment of the present invention. In FIGS. 6-11, the original spectrum is plotted as a solid line, while the reconstructed values are plotted as a sequence of points.

Figure 7:
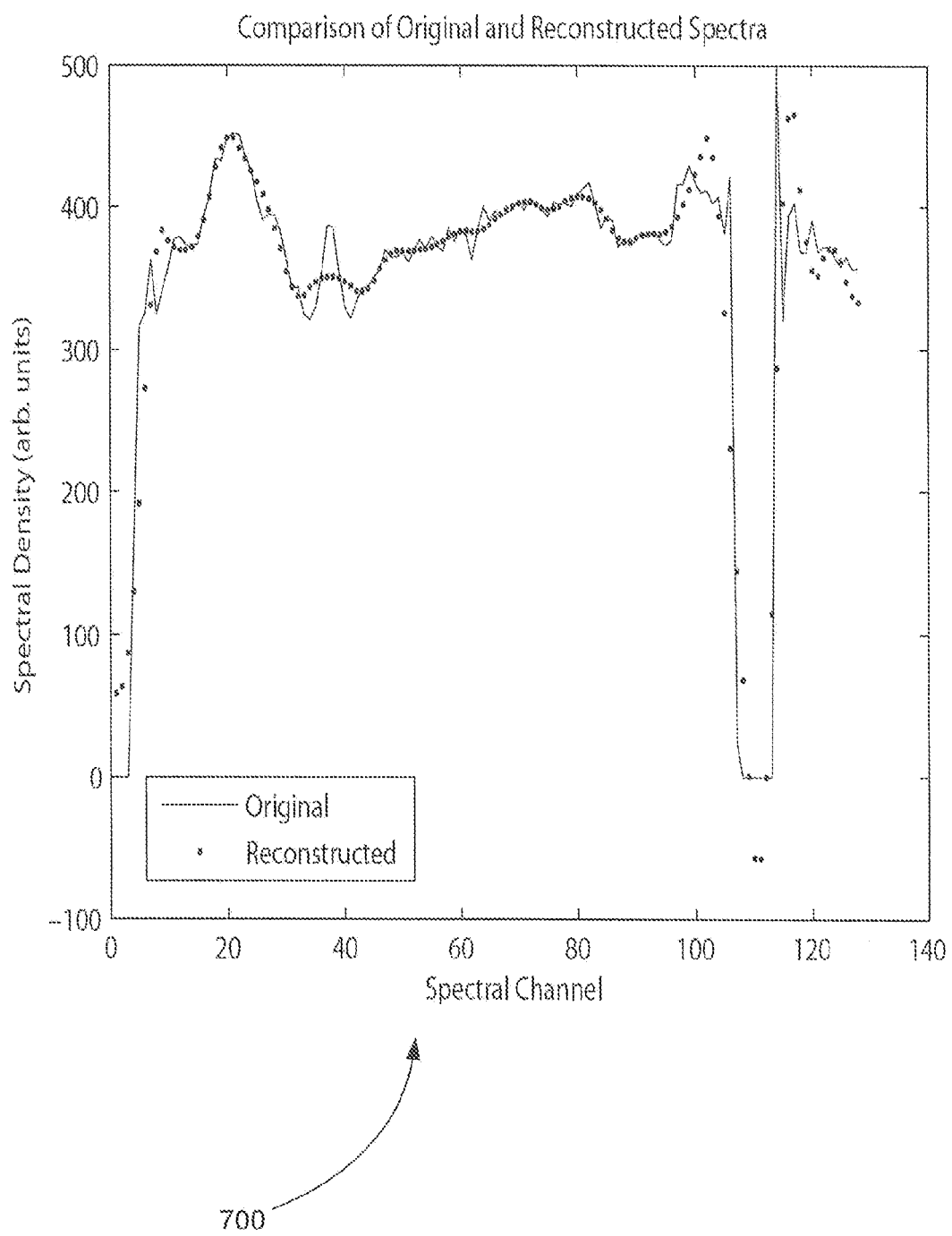
FIG. 7 is a plot comparing the source spectra and the reconstructed spectra at spatial location B, in accordance with an embodiment of the present invention.

FIG. 7 is a plot 700 comparing the source spectra and the reconstructed spectra at spatial location B, in accordance with an embodiment of the present invention.

Figure 8:
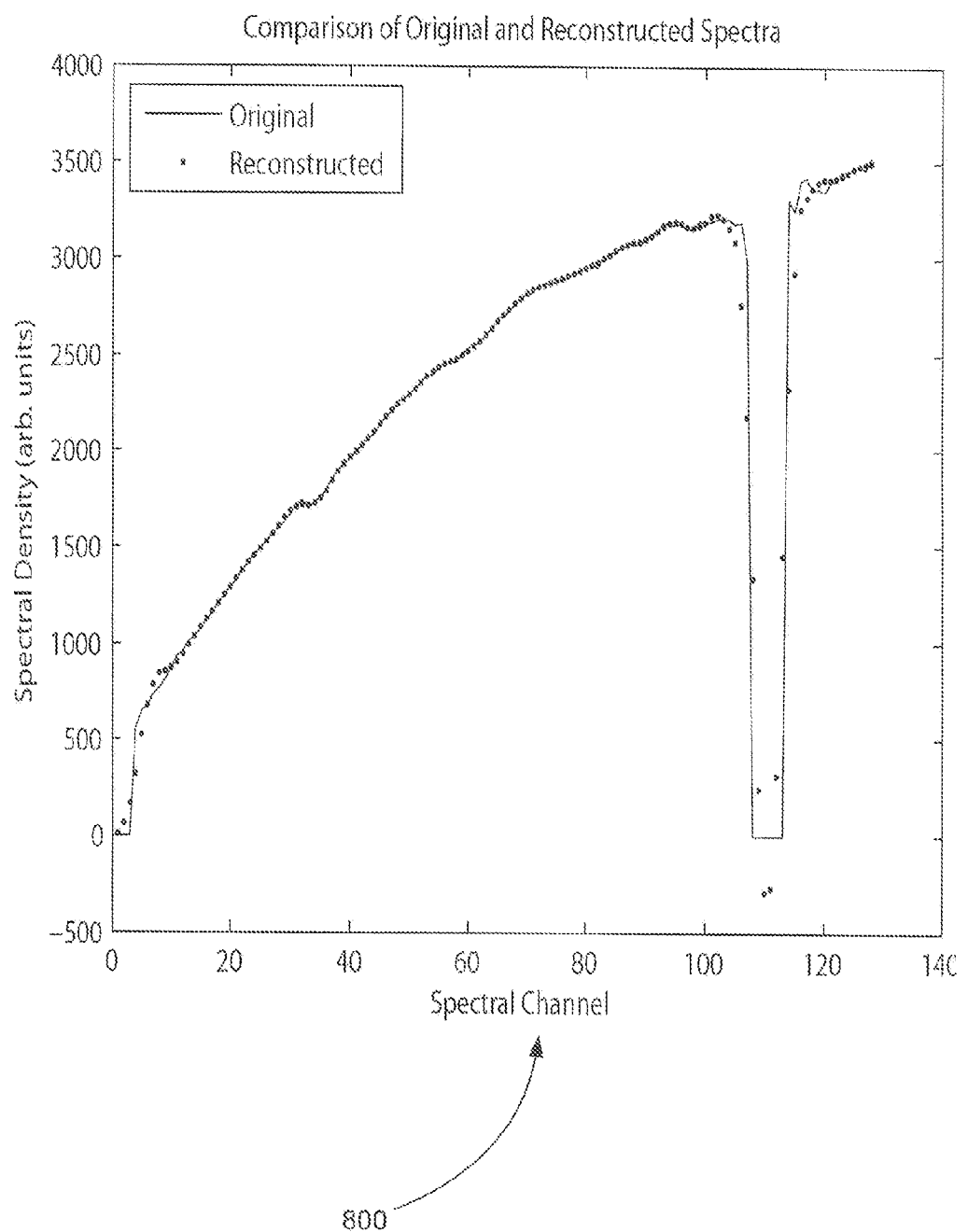
FIG. 8 is a plot comparing the source spectra and the reconstructed spectra at spatial location C, in accordance with an embodiment of the present invention.

FIG. 8 is a plot 800 comparing the source spectra and the reconstructed spectra at spatial location C, in accordance with an embodiment of the present invention.

Figure 9:
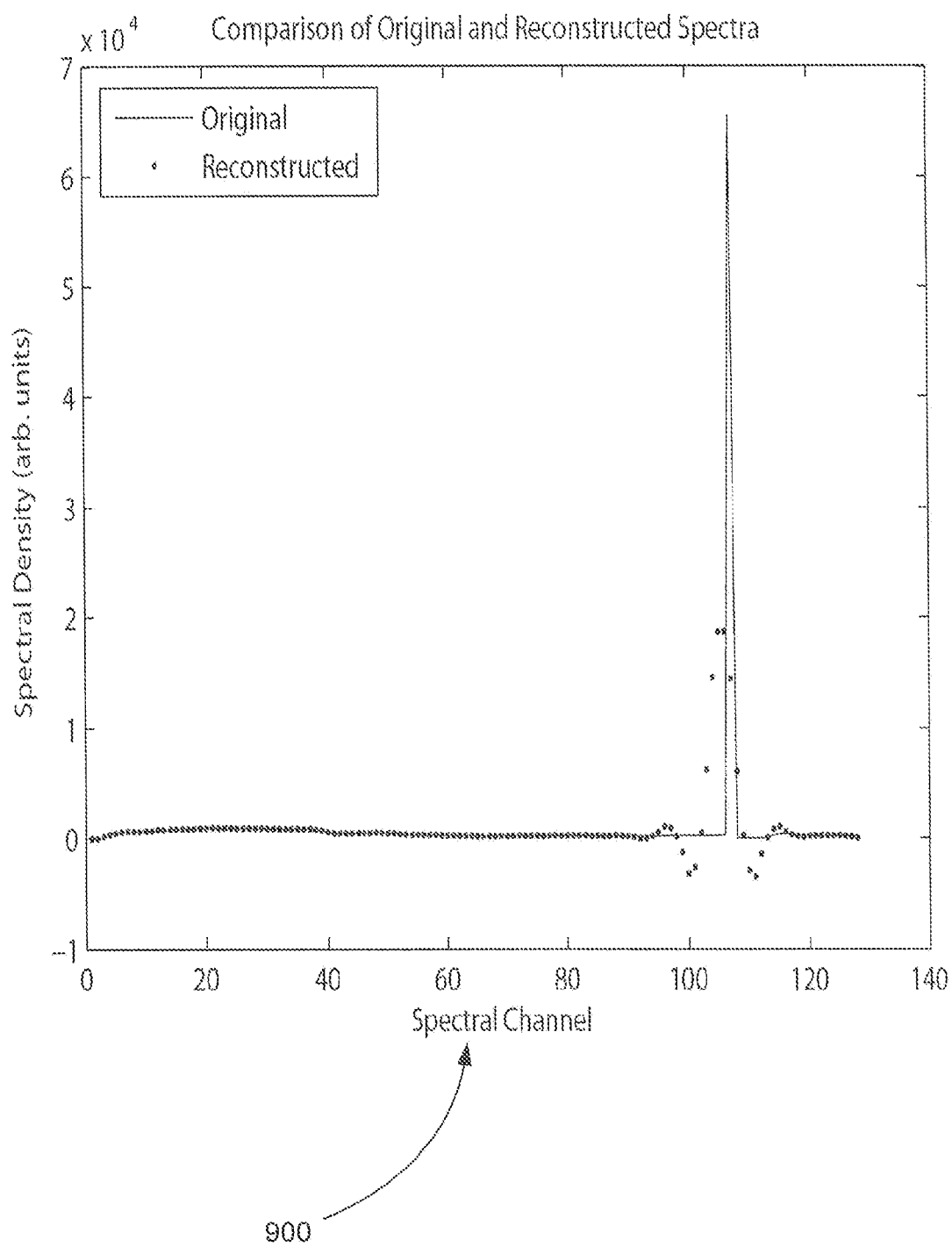
FIG. 9 is a plot comparing the source spectra and the reconstructed spectra at spatial location D, in accordance with an embodiment of the present invention.

FIG. 9 is a plot 900 comparing the source spectra and the reconstructed spectra at spatial location D, in accordance with an embodiment of the present invention.

Figure 10:
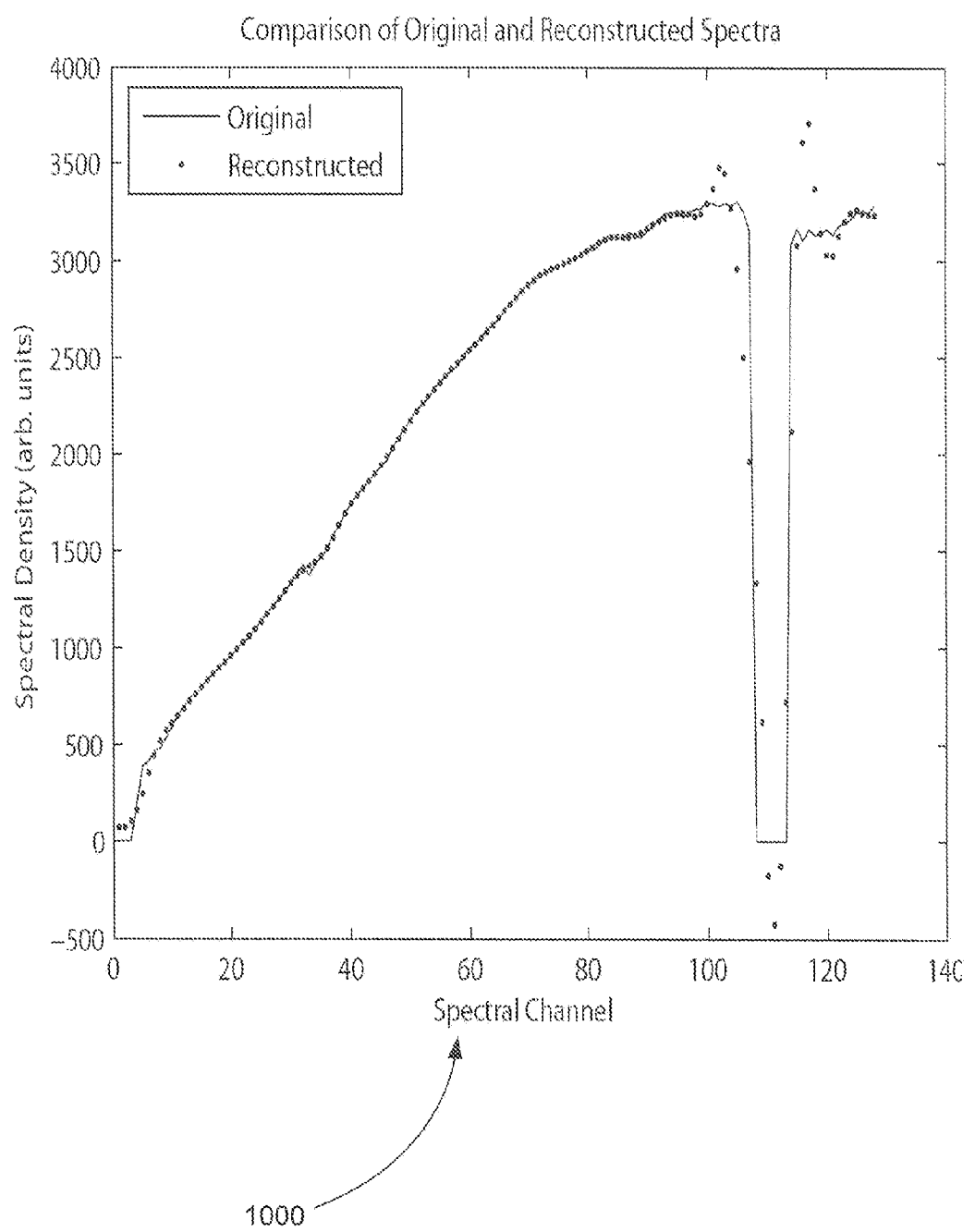
FIG. 10 is a plot comparing the source spectra and the reconstructed spectra at spatial location E, in accordance with an embodiment of the present invention.

FIG. 10 is a plot 1000 comparing the source spectra and the reconstructed spectra at spatial location E, in accordance with an embodiment of the present invention.

Figure 11:
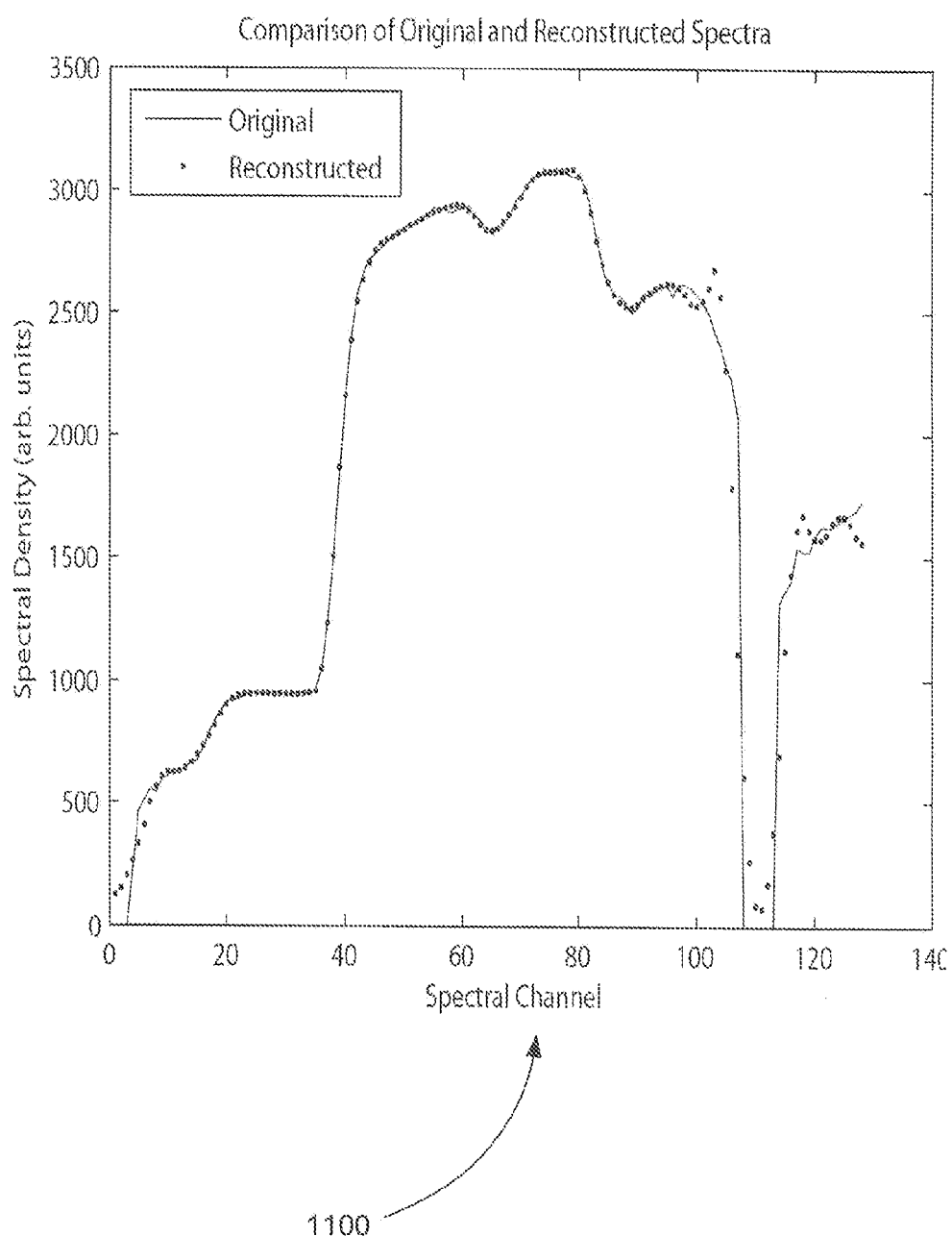
FIG. 11 is a plot comparing the source spectra and the reconstructed spectra at spatial location F, in accordance with an embodiment of the present invention.

FIG. 11 is a plot 1100 comparing the source spectra and the reconstructed spectra at spatial location F, in accordance with an embodiment of the present invention.

There are a number of interesting features in these performance results. First, the source contains a region of zero value in spectral bands≈108-115. This produces sharp discontinuities in the signal which, unsurprisingly, cause problems for the approach that assumes a degree of signal smoothness. In addition to rounding the sharp edges, the reconstruction shows "ringing" in nearby spectral bands. This is a shortcoming that can be corrected by inference algorithms that go beyond solely null-space smoothing.

Second, the performance on the regions of the spectra that are smooth is almost invariably excellent. The one notable exception is region B, where the signal level is approximately an order of magnitude smaller than the other regions, and contains a number of more narrow features.

So, in general, the spectral performance of the reconstruction is quite good. To compare the spatial performance, images at particular spectral channels are examined. Based on the spectral plots above, spectral channels 14, 42, and 94 are chosen. The regions of spectral ringing are avoided as the system performance is known as substandard.

Figure 12:
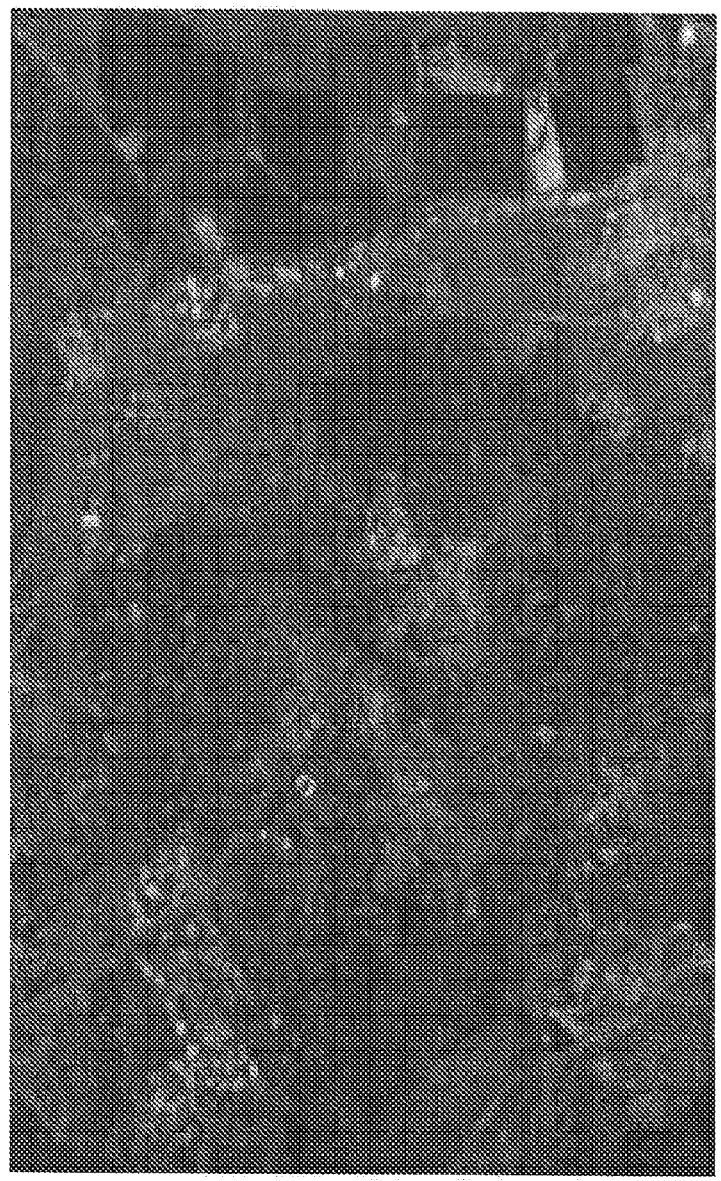
FIG. 12 is an intensity image of the source obtained using spectral channel 14, in accordance with an embodiment of the present invention.

FIG. 12 is an intensity image 1200 of the source obtained using spectral channel 14, in accordance with an embodiment of the present invention.

Figure 13:
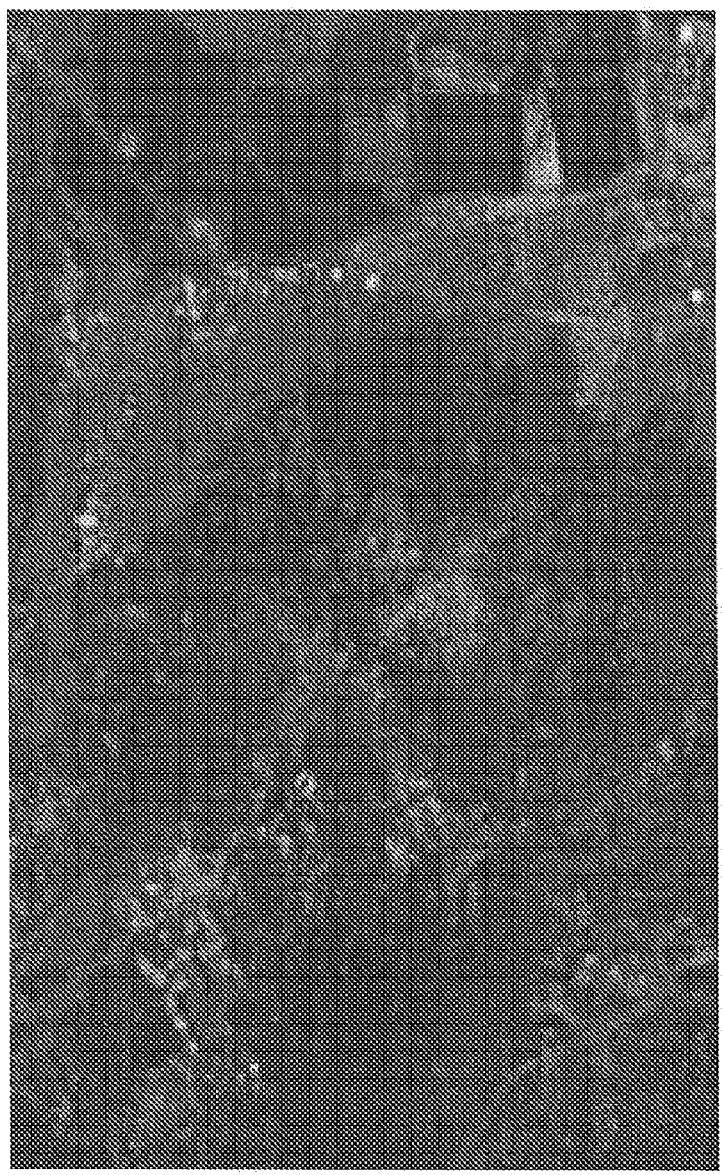
FIG. 13 is a reconstructed intensity image of the source obtained using spectral channel 14, in accordance with an embodiment of the present invention.
Figure 13:
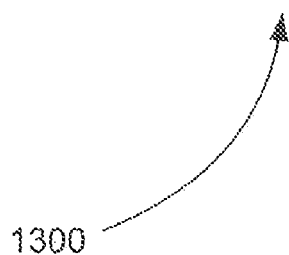

FIG. 13 is a reconstructed intensity image 1300 of the source obtained using spectral channel 14, in accordance with an embodiment of the present invention.

Figure 14:
FIG. 14 is an intensity image of the source obtained using spectral channel 42, in accordance with an embodiment of the present invention.

FIG. 14 is an intensity image 1400 of the source obtained using spectral channel 42, in accordance with an embodiment of the present invention.

Figure 15:
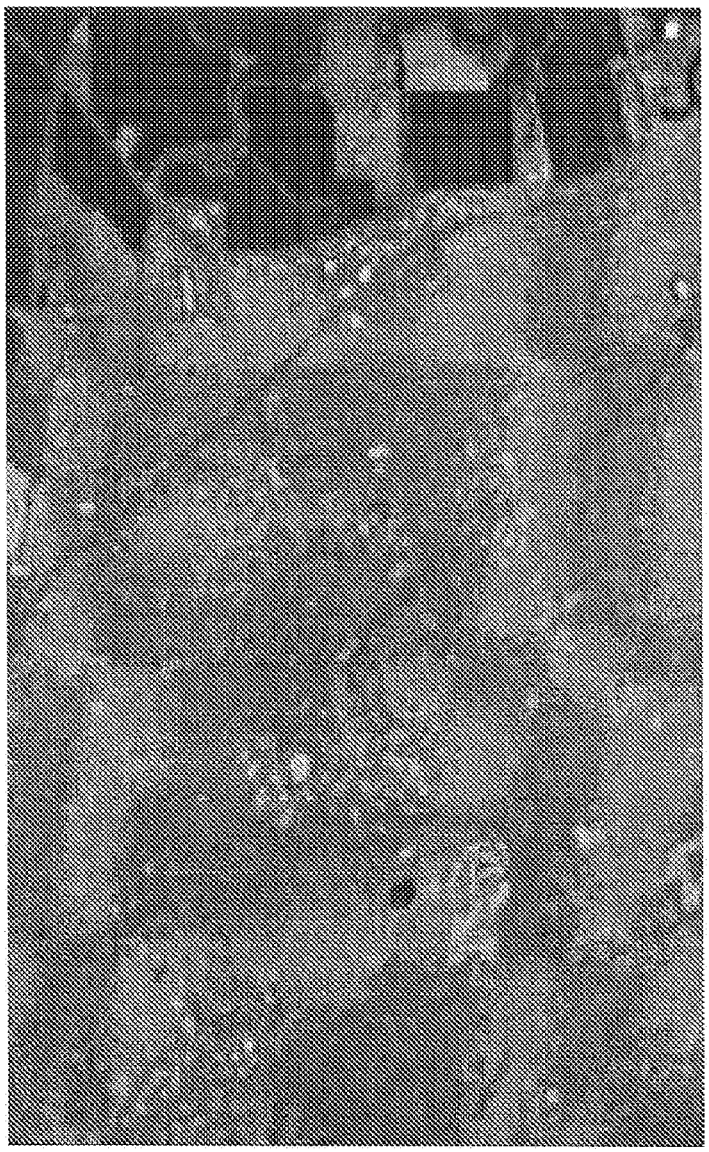
FIG. 15 is a reconstructed intensity image of the source obtained using spectral channel 42, in accordance with an embodiment of the present invention.

FIG. 15 is a reconstructed intensity image 1500 of the source obtained using spectral channel 42, in accordance with an embodiment of the present invention.

Figure 16:
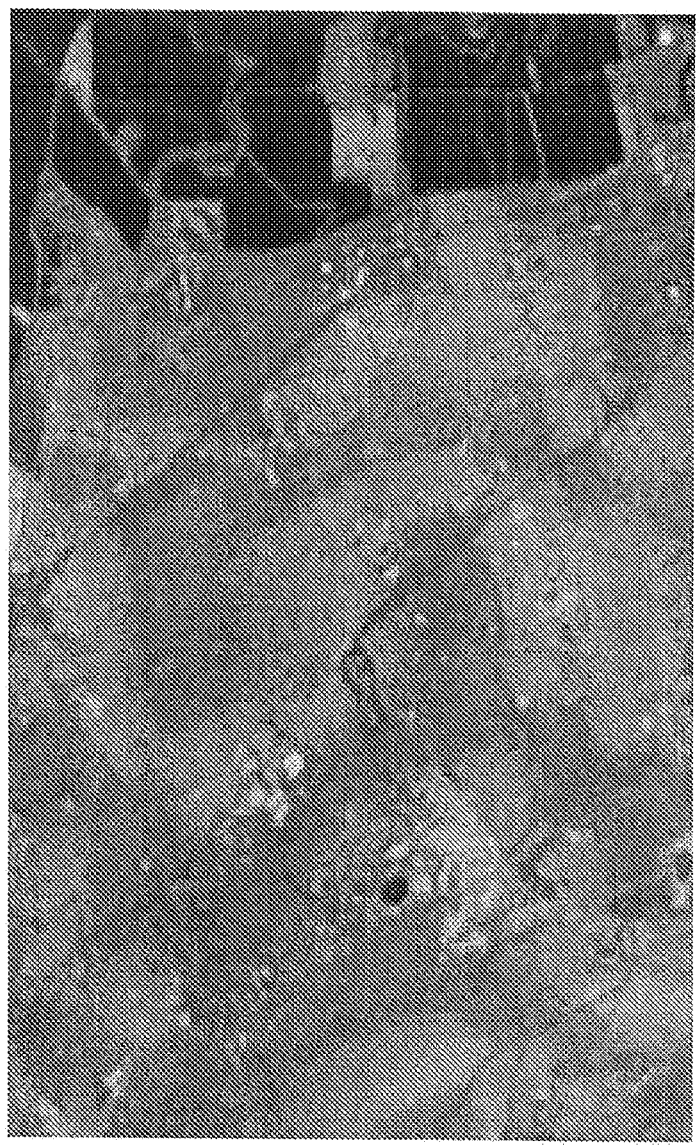
FIG. 16 is an intensity image of the source obtained using spectral channel 94, in accordance with an embodiment of the present invention.

FIG. 16 is an intensity image 1600 of the source obtained using spectral channel 94, in accordance with an embodiment of the present invention.

Figure 17:
FIG. 17 is a reconstructed intensity image of the source obtained using spectral channel 94, in accordance with an embodiment of the present invention.
Figure 17:
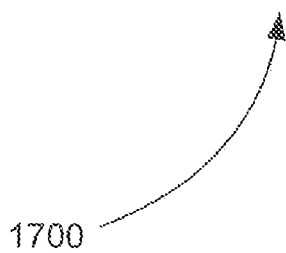

FIG. 17 is a reconstructed intensity image 1700 of the source obtained using spectral channel 94, in accordance with an embodiment of the present invention.

To an untrained eye, the reconstructions in FIGS. 13, 15, and 17 are indistinguishable from the original images shown in FIGS. 12, 14, and 16, respectively.

In summary, an embodiment as described above combines the design on coded-aperture spectral imaging systems with the approach to compressive sensing. The result is an inexpensive, mechanically-robust spectral imaging system that can impose an arbitrary compressive code on the wavelength dimension of the datacube. As more sophisticated coding schemes and inference algorithms are designed, they can easily be incorporated into the system by changing the only the coding mask.

Regardless of the final form of the inference algorithms, null-space smoothing (or a related concept) is likely to play an important role. Initial simulations of null-space smoothing in the spectral imaging problem show that it functions well in this domain. Primary difficulties arise near spectral discontinuities, as would be expected. This should be resolved with more sophisticated inference algorithms that incorporate statistical knowledge of the signal as well as structural.

Figure 18:
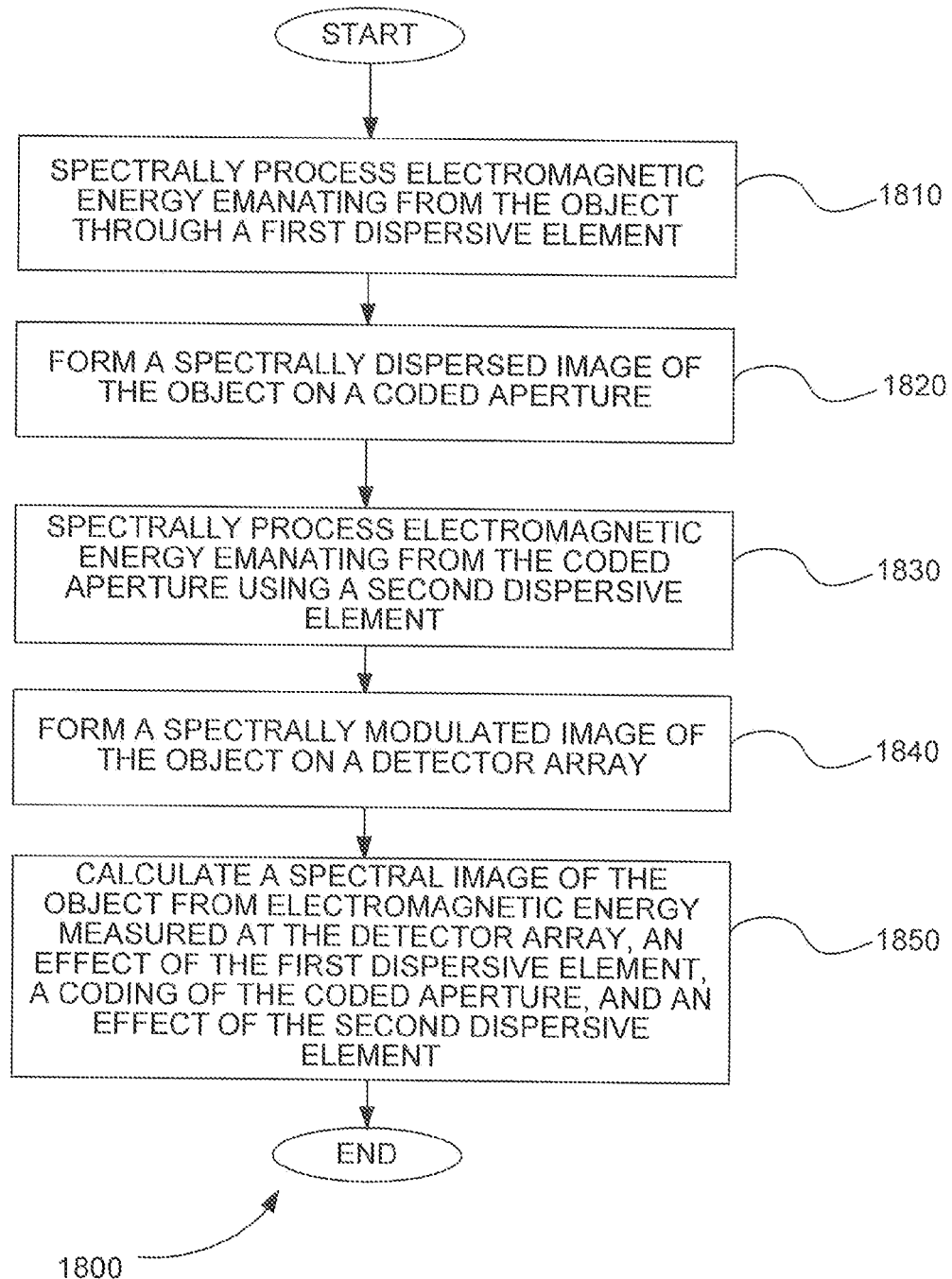
FIG. 18 is a flowchart showing a method for spectrally imaging an object, in accordance with an embodiment of the present invention.

FIG. 18 is a flowchart showing a method 1800 for spectrally imaging an object, in accordance with an embodiment of the present invention.

In step 1810 of method 1800, electromagnetic energy emanating from the object is spectrally processed through a first dispersive element. Electromagnetic energy can be, but is not limited to, light.

In step 1820, a spectrally dispersed image of the object is formed on a coded aperture. The coded aperture can be, but is not limited to, a transmission mask.

In step 1830, electromagnetic energy emanating from the coded aperture is spectrally processed using a second dispersive element.

In step 1840, a spectrally modulated image of the object is formed on a detector array. The detector array can be, but is not limited to, a two-dimensional detector array.

In step 1850, a spectral image of the object is calculated from electromagnetic energy measured at the detector array, an effect of the first dispersive element, a coding of the coded aperture, and an effect of the second dispersive element.

In another embodiment of method 1800, a first dispersion of the first dispersive element is equal but opposite to a second dispersion of the second dispersive element. The first dispersive element and the second dispersive element are diffraction gratings, for example. The coded aperture is implemented for transmission of electromagnetic energy, for example.

In another embodiment of method 1800, electromagnetic energy emanating from the second dispersive element is measured by the detector in a single time step.

In another embodiment of method 1800, the spectral image of the object is calculated using a number of measurements that is less than the number of elements in the spectral image.

In another embodiment of method 1800, an inference algorithm is applied to the spectral image. In inference algorithm can include, but is not limited to, a null-space smoothing algorithm.

In another embodiment of method 1800, the first dispersive element and the second dispersive element are prisms.

In another embodiment of method 1800, the first dispersive element is a diffraction grating and the second dispersive element is a prism.

In another embodiment of method 1800, the second dispersive element is a diffraction grating and the first dispersive element is a prism.

In another embodiment of method 1800, the coded aperture is implemented for reflection of electromagnetic energy.

In another embodiment of method 1800, the coded aperture is a dynamic mask. A dynamic mask is a mask in which the pattern is changeable. The dynamic mask is a digital micromirror array, for example.

In another embodiment of method 1800, the dynamic mask is a spatial light modulator array.

Figure 19:
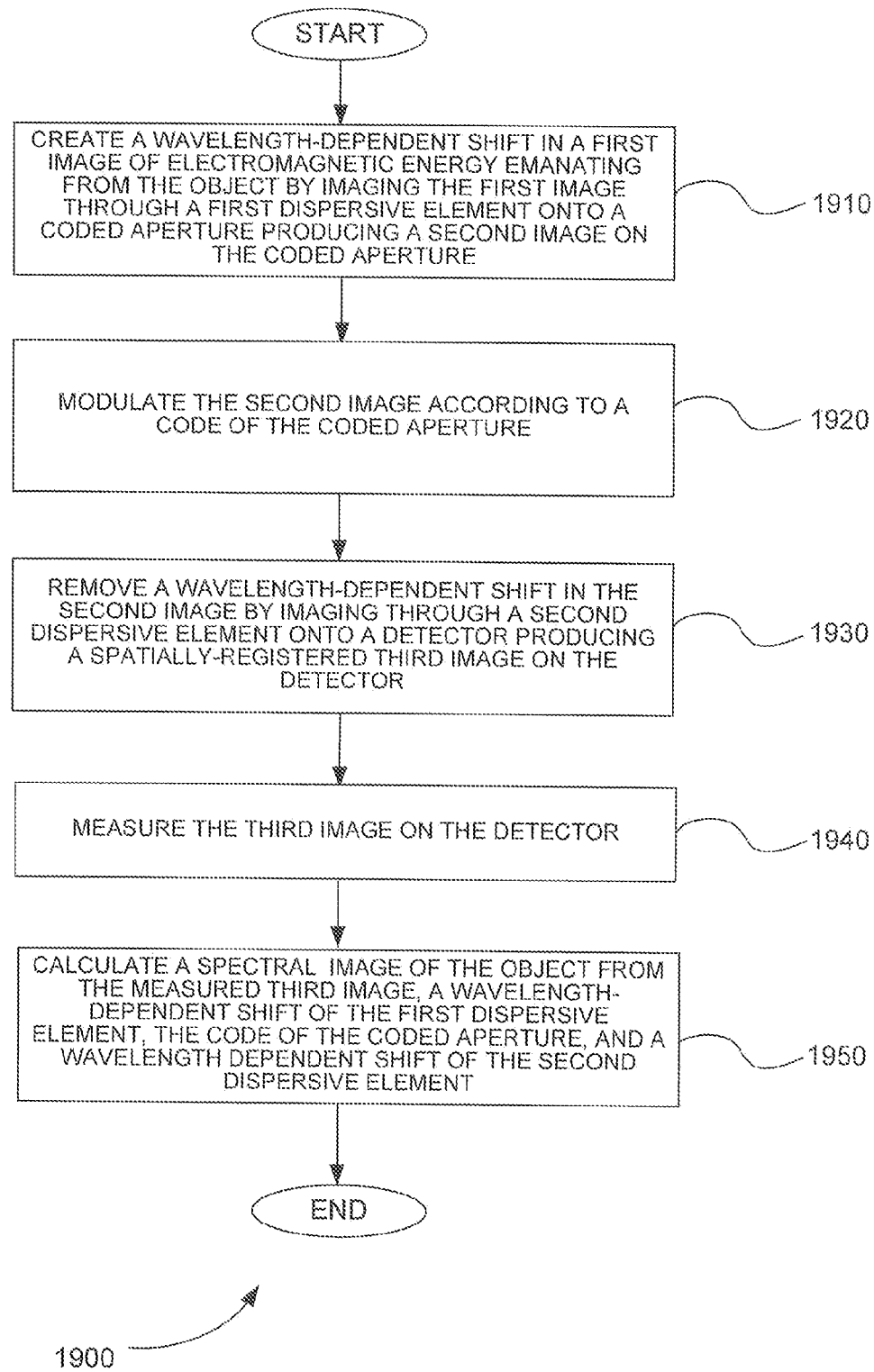
FIG. 19 is a flowchart showing a method for spectrally imaging an object including two equal but opposite frequency independent shifts in the image of the object, in accordance with en embodiment of the present invention.

FIG. 19 is a flowchart showing a method 1900 for spectrally imaging an object including two equal but opposite frequency independent shifts in the image of the object, in accordance with an embodiment of the present invention.

In step 1910 of method 1900, a wavelength-dependent shift is created in a first image of electromagnetic energy emanating from the object by imaging the first image through a first dispersive element onto a coded aperture producing a second image on the coded aperture. Electromagnetic energy can be, but is not limited to, light. The coded aperture can be, but is not limited to, a transmission mask.

In step 1920, the second image is modulated according to a code of the coded aperture.

In step 1930, a wavelength-dependent shift in the second image is removed by imaging through a second dispersive element onto a detector producing a spatially-registered third image on the detector. The detector can be, but is not limited to, a two-dimensional detector array.

In step 1940, the third image is measured on the detector.

In step 1950, a spectral image of the object is calculated from the measured third image, a wavelength-dependent shift of the first dispersive element, the code of the cooled aperture, and a wavelength dependent shift of the second dispersive element.

In another embodiment of method 1900, the third image is measured on the detector in a single time step.

In another embodiment of method 1900, the spectral image of the object is calculated using a number of measurements that is less than the number of elements in the spectral of the object.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously perform hyperspectral imaging with a high optical efficiency, with a low component and design cost, and without the missing cone problem. Systems and methods in accordance with an embodiment of the present invention disclosed herein can also generate a datacube using fewer measurements than the number of elements in the reconstructed datacube.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for imaging an object, comprising:
   spectrally processing electromagnetic energy emanating from the object through a first dispersive element;
   forming a spectrally dispersed image of the object on a coded aperture;
   spectrally processing electromagnetic energy emanating from the coded aperture using a second dispersive element;
   forming a spectrally modulated image of the object on a detector array; and
   calculating a spatio-spectral image of the object from the spectrally modulated image measured at the detector array, an effect of the first dispersive element, a coding of the coded aperture, and an effect of the second dispersive element, wherein the spectrally modulated image is measured in a single time step and the number of measurements in the spectrally modulated image is less than the number of spatio-spectral elements in the spatio-spectral image.

2. The method of claim 1, wherein a first dispersion of the first dispersive element is substantially equivalent but opposite to a second dispersion of the second dispersive element.

3. The method of claim 1, further comprising applying an inference algorithm to the spectrally modulated image to calculate the spatio-spectral image.

4. The method of claim 3, wherein the inference algorithm comprises null-space smoothing.

5. A method for imaging an object, comprising:
   creating a wavelength-dependent shift in a first image of electromagnetic energy emanating from the object by imaging the first image through a first dispersive element onto a coded aperture producing a second image on the coded aperture;
   modulating the second image according to a code of the coded aperture
   removing a wavelength-dependent shift in the second image by imaging through a second dispersive element onto a detector producing a spatially-registered third image on the detector;
   measuring the third image on the detector; and
   calculating a spatio-spectral image of the object from the measured third image, a wavelength-dependent shift of the first dispersive element, the code of the coded aperture, and a wavelength dependent shift of the second dispersive element, wherein the third image is measured in a single time step and the number of measurements in the third image is less than the number of spatio-spectral elements-in the spatio-spectral image.

6. A system for imaging an object, comprising:
   a first dispersive element;
   a second dispersive element;
   a coded aperture;
   a detector, wherein the first dispersive element is located between the source object and the coded aperture, wherein the second dispersive element is located between the coded aperture and the detector plane, and wherein electromagnetic energy emanating from the source passes through the first dispersive element, electromagnetic energy emanating from the first dispersive element is imaged onto the coded aperture, electromagnetic energy emanating from the coded aperture passes through the second dispersive element, electromagnetic energy emanating from the second dispersive element is imaged onto the detector, and electromagnetic energy imaged onto the detector is measured by the detector in a single time step as a spectrally modulated image; and a processor, wherein the processor calculates a spatio-spectral image of the object from the spectrally modulated image measured at the detector, an effect of the first dispersive element, a coding of the coded aperture, and an effect of the second dispersive element, wherein the number of measurements in the spectrally modulated image is less than the number of spatio-spectral elements-in the spatio-spectral image.

7. The system of claim 6, wherein the first dispersive element and the second dispersive element are diffraction gratings.

8. The system of claim 6, wherein the first dispersive element and the second dispersive element are prisms.

9. The system of claim 6, wherein the first dispersive element is a diffraction grating and the second dispersive element is a prism.

10. The system of claim 6, wherein the second dispersive element is a diffraction grating and the first dispersive element is a prism.

11. The system of claim 6, wherein the coded aperture comprises a transmission.

12. The system of claim 6, wherein the coded aperture comprises a reflection.

13. The system of claim 6, wherein the coded aperture comprises a dynamic mask.

14. The system of claim 13, wherein the dynamic mask comprises a digital micromirror array.

15. The system of claim 13, wherein the dynamic mask comprises a spatial light modulator array.

16. The method of claim 5, further comprising applying an inference algorithm to the third image to calculate the spatio-spectral image.

17. The method of claim 16, wherein the inference algorithm comprises null-space smoothing.

18. The system of claim 6, wherein the processor further applies an inference algorithm to the spectrally modulated image to calculate the spatio-spectral image.

19. The system of claim 18, wherein the inference algorithm comprises null-space smoothing.

\* \* \* \* \*